United States Patent
Worrall et al.

(10) Patent No.: US 10,757,619 B2
(45) Date of Patent: Aug. 25, 2020

(54) SPECIAL CELL SELECTION AT SECONDARY NETWORK NODES SUPPORTING DUAL CONNECTIVITY

(71) Applicant: Alcatel Lucent, Boulogne Billancourt (FR)

(72) Inventors: Chandrika Worrall, Swindon (GB); Sudeep Palat, Swindon (GB)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/501,601

(22) PCT Filed: Jul. 13, 2015

(86) PCT No.: PCT/EP2015/065954
§ 371 (c)(1),
(2) Date: Feb. 3, 2017

(87) PCT Pub. No.: WO2016/020146
PCT Pub. Date: Feb. 11, 2016

(65) Prior Publication Data
US 2017/0223762 A1     Aug. 3, 2017

(30) Foreign Application Priority Data
Aug. 6, 2014   (EP) .................................. 14306243

(51) Int. Cl.
*H04W 76/20*       (2018.01)
*H04W 36/08*       (2009.01)
(Continued)

(52) U.S. Cl.
CPC ........... *H04W 36/08* (2013.01); *H04W 24/10* (2013.01); *H04W 76/15* (2018.02); *H04W 36/0069* (2018.08); *H04W 76/20* (2018.02)

(58) Field of Classification Search
CPC combination set(s) only.
See application file for complete search history.

(56) References Cited

U.S. PATENT DOCUMENTS

2014/0192775 A1   7/2014 Li
2015/0043392 A1*  2/2015 Susitaival ............. H04L 5/1469
                                                                370/280
(Continued)

FOREIGN PATENT DOCUMENTS

CN        102083153     6/2011
CN        103517355     1/2014
(Continued)

OTHER PUBLICATIONS

Nagasaka—U.S. Appl. No. 61/955,983, filed Mar. 20, 2014 (Year: 2014).*
(Continued)

*Primary Examiner* — Kodzovi Acolatse
*Assistant Examiner* — The Hy Nguyen
(74) *Attorney, Agent, or Firm* — Fay Sharpe LLP

(57) ABSTRACT

A computer program, network node and method performed at a secondary network node within a wireless communication network supporting dual connectivity, such that a user equipment may communicate with a master network node and a secondary network node at a same time, the secondary network node supporting a plurality of cells. The method comprising: determining at the secondary network node that a configuration of one of the plurality of cells as a special cell for the user equipment such that the special cell provides predetermined functionality should be transferred to another one of the plurality of cells; and in response to the determining step, transmitting a request for a change in special cell towards the master network node.

14 Claims, 4 Drawing Sheets special SCG cell change using MeNB initiated SeNB modification procedure.

(51) Int. Cl.
*H04W 76/15* (2018.01)
*H04W 24/10* (2009.01)
*H04W 36/00* (2009.01)

(56) References Cited

U.S. PATENT DOCUMENTS

| | | | | |
|---|---|---|---|---|
| 2015/0092750 | A1* | 4/2015 | Huang | H04W 36/08 370/331 |
| 2015/0215826 | A1* | 7/2015 | Yamada | H04W 36/0072 455/436 |
| 2016/0219604 | A1* | 7/2016 | Fujishiro | H04W 72/085 |
| 2016/0302126 | A1* | 10/2016 | Gao | H04W 36/08 |
| 2016/0302188 | A1* | 10/2016 | Lu | H04L 5/0092 |
| 2016/0338039 | A1* | 11/2016 | Van Der Velde | H04W 24/02 |
| 2017/0078940 | A1* | 3/2017 | Zhang | H04W 36/0055 |
| 2018/0054846 | A1* | 2/2018 | Nagasaka | H04W 28/08 |

FOREIGN PATENT DOCUMENTS

| | | |
|---|---|---|
| CN | 103581933 | 2/2014 |
| IN | 202/che/2014 | * 1/2014 |

OTHER PUBLICATIONS

Alcatel-Lucent et al., "Aspects on special cell change using SCG modification procedure," 3$^{rd}$ Generation Partnership Project (3GPP), 3GPP TSG RAN WG2 Meeting #86, R2-142574, XP002737380, pp. 1-4, Seoul, South Korea, May 19-23, 2014.

Alcatel-Lucent et al., "Discussion on Special cell change," 3$^{rd}$ Generation Partnership Project (3GPP), 3GPP TSG RAN WG2 Meeting #86, R2-142571, XP050793668, pp. 1-6, Seoul, South Korea, May 19-23, 2014.

Alcatel-Lucent et al., Discussion on the remaining S-RLF issues in dual connectivity, 3$^{rd}$ Generation Partnership Project (3GPP), 3GPP TSG RAN WG2 Meeting #86, R2-142567, XP050793664, pp. 1-3, Seoul, South Korea, May 19-23, 2014.

NEC, "SCell change in dual connectivity," 3$^{rd}$ Generation Partnership Project (3GPP), 3GPP TSG RAN2 Meeting #85, R2-140512, XP050791861, 4 pages, Prague, Czech Republic, Feb. 10-14, 2014.

International Search Report for PCT/EP2015/065954 dated Aug. 11, 2015.

CATT, SCG Cell Management[online], 3GPP TSG-RAN WG2#86 R2-142381, Internet <URL:http://www.3gpp.org/ftp/tsg_ran/WG2_RL2/TSGR2_86/Docs/R2-142381.zip>, May 23, 2014.

Samsung, Report on [85#21][LTE/DC] Basic signalling flows (Samsung)[online], 3GPP TSG-RAN WG2#85bis R2-141465, Internet <URL:http://www.3gpp.org/ftp/tsg_ran/WG2_RL2/TSGR2_85bis/Docs/R2-141465.zip>, Apr. 4, 2014.

Alcatel-Lucent, Alcatel-Lucent Shanghai Bell, Discussion on PSCell change[online], 3GPP TSG-RAN WG2#87 R2-143641, Internet <URL:http://www.3gpp.org/ftp/tsg_ran/WG2_RL2/TSGR2_87/Docs/R2-143641.zip>, Aug. 22, 2014.

Alcatel-Lucent, Alcatel-Lucent Shanghai Bell, System Information update in dual connectivity[online], 3GPP TSG-RAN WG2#87 R2-143643, Internet <URL:http://www.3gpp.org/ftp/tsg_ran/WG2_RL2/TSGR2_87/Docs/R2-143643.zip>, Aug. 22, 2014.

* cited by examiner

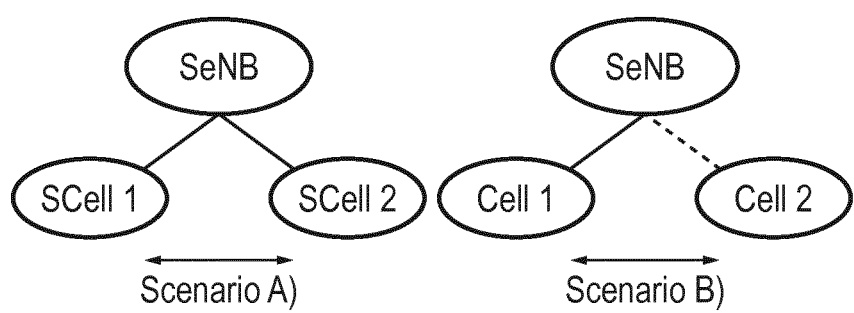
FIG. 1: special cell change scenarios

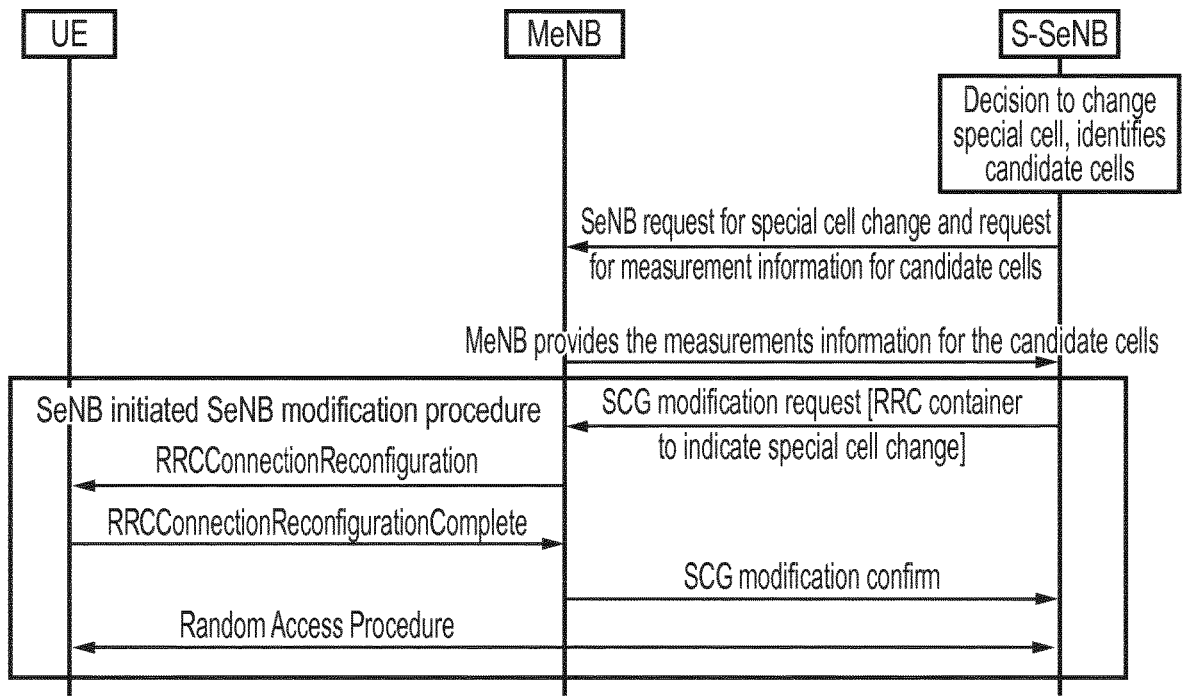
FIG. 2: special SCG cell change using SeNB initiated SeNB modification procedure.
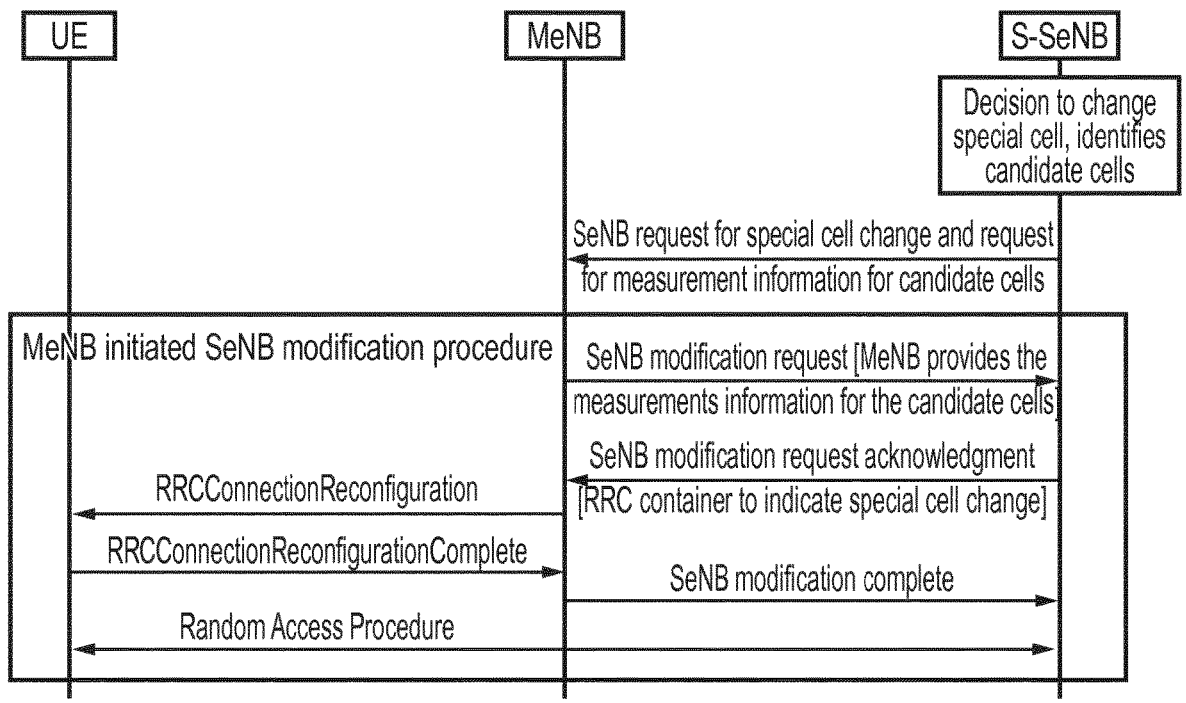
FIG. 3: special SCG cell change using MeNB initiated SeNB modification procedure.

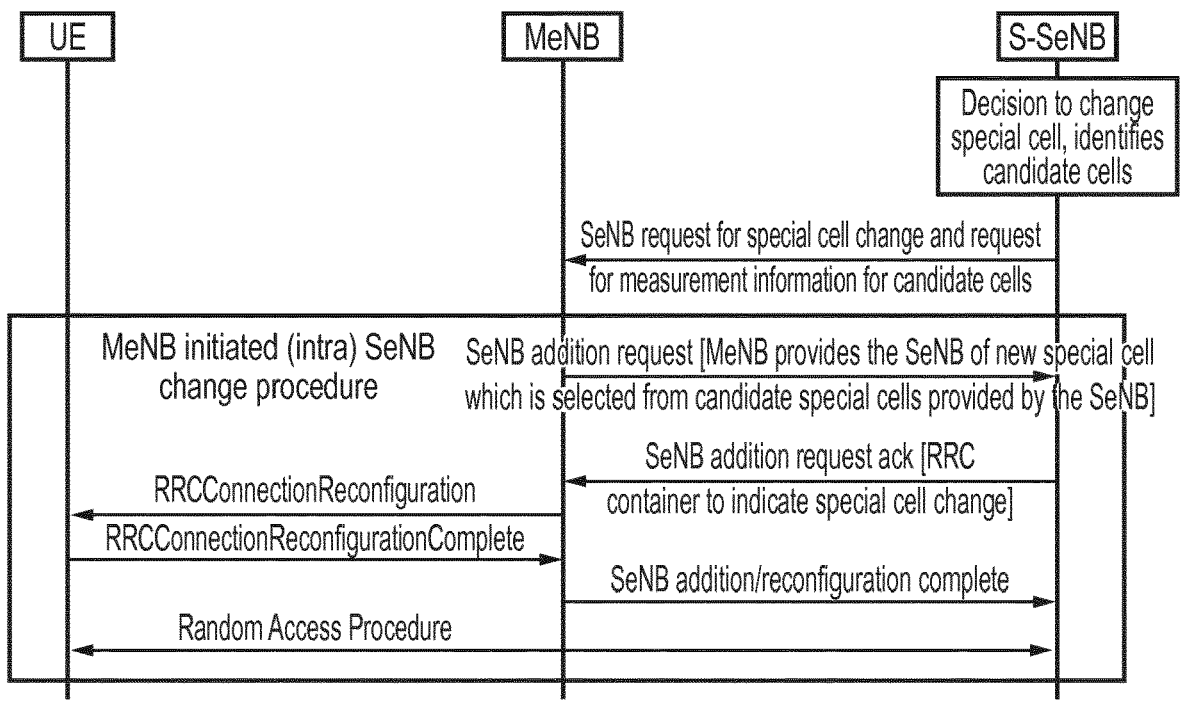
FIG. 4: special SCG cell change using SeNB Change procedure.
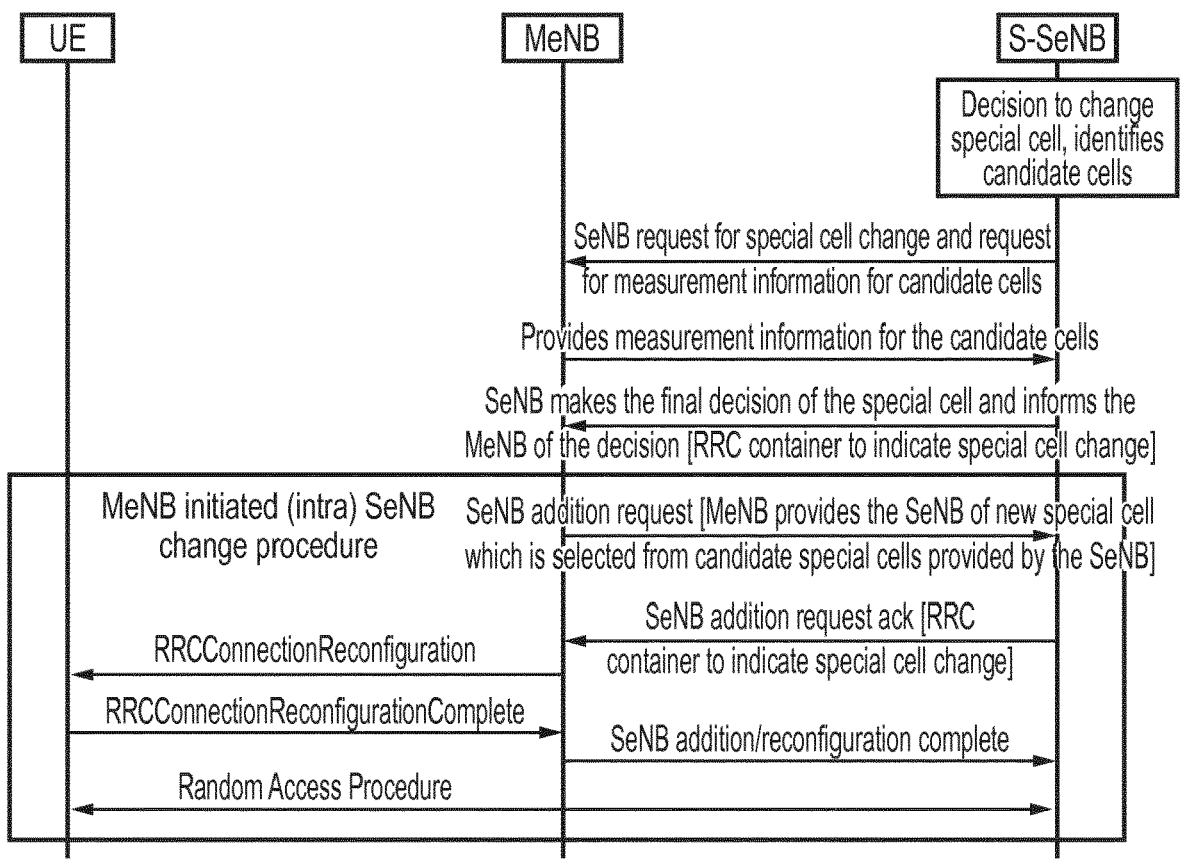
FIG. 5: special SCG cell change using SeNB Change procedure.

SPECIAL CELL SELECTION AT SECONDARY NETWORK NODES SUPPORTING DUAL CONNECTIVITY

FIELD OF THE INVENTION

The field of the invention relates to wireless communication networks and in particular, to wireless communication networks that support dual connectivity where a user equipment can communicate with a master network node and a secondary network node at a same time.

BACKGROUND

Dual connectivity where a user equipment can consume radio resources provided by more than one network node is known. One of the network nodes functions as a master network node and performs data plane along with control plane signalling transmitting system information, handling connectivity and performing RRC radio resource configuration signalling with the user equipment. The other network node(s) are secondary network node(s) and communicate with the user equipment in the data plane and receive the configuration information required to do this from the master network node perhaps via a backhaul link. This backhaul communication link has latency associated with it and thus, control signalling relating to data transmission such as acknowledgement messages are preferably transmitted directly by and to the secondary network node itself. Thus, an additional PUCCH physical uplink control channel may be provided to the secondary network node which allows these control messages to be sent from the user equipment directly to the secondary network node.

Where the secondary network node has several carriers supporting several cells then for a UE that it is communicating with, a particular cell may be configured to receive the PUCCH for communication with the UE. The cell configured to receive this control channel is termed a special cell. Problems may arise where the quality of signals from the special cell drop.

It would be desirable to be able to change the cell that is configured as a special cell at a secondary network node without unduly interrupting the ongoing UE communications with the secondary network node.

SUMMARY

A first aspect of the present invention provides a method performed at a secondary network node within a wireless communication network supporting dual connectivity, such that a user equipment may communicate with a master network node and a secondary network node, said secondary network node supporting a plurality of cells, said method comprising: determining at said secondary network node that a configuration of a cell supported by said secondary network node as a special cell for said user equipment such that said special cell provides predetermined functionality should be transferred to another one of said plurality of cells; and in response to said determining step, transmitting a request for a change in special cell towards said master network node.

The present invention recognises that there may be circumstances where it is desirable to change the cell provided with special cell functionality such that another of the cells supported by the secondary network node becomes the special cell for a user equipment. It also recognises that a problem of selecting which cell to use as a new special cell arises as the secondary network node may have limited or no visibility of the channel quality of the different cells. Furthermore, the master network node rather than the secondary network node is in control of the measurement of the connection with the user equipment and as such the secondary network node cannot itself control such a change without communicating with the master network node.

Currently there exists a secondary network node change procedure which could be used to attain information regarding the channel signal quality levels of the different cells, and to update the configuration information of a connection, however, this procedure results in user plane interruption and is under control of the master network node.

These problems have been addressed by the present invention by the introduction of a special cell change request which is transmitted by the secondary network node to the master network node when it determines that there should be a change in special cell. The present invention recognises that the master network node not only controls the configuration of the connection with the user equipment but also receives measurement information from the user equipment regarding channel quality. Thus, by providing this additional request, the master network node which has access to measurement information and control of the configuration of the user equipment connection with the network nodes is informed of the requirement to change the current special cell and can act accordingly.

In some embodiments, the method further comprises determining which of said plurality of cells would be suitable candidate cells for use as special cells, and transmitting a list of at least one candidate cell in said change request.

In some cases, it may be desirable for the secondary network node to determine which of the plurality of cells that it supports would be suitable candidate cells for use as special cells for communication with the user equipment and to transmit a list of these candidate cells with the change request.

In some embodiments, said change request further comprises a request for measurement information for at least some of said cells.

As noted previously, the secondary network node may have limited or indeed no visibility of the channel quality of the channels of the various cells it support as measuring information regarding this is received from the user equipment at the master network node. When determining which cells to use as a special cell, this information is required and as such where the secondary network node makes this determination, it will require this information if it is to make a sensible decision. Thus, it may request measurement information from the network node for at least some of the cells. Where it has transmitted a list of candidate cells in the change request then it may request measurement information for these cells as these are the cells it is considering. In other embodiments it may receive measurement information for all of the cells.

Although the request for measurement information may be transmitted with the change request, in some embodiments it is transmitted at other times perhaps periodically and in which case the information requested may be for all of the cells or for a subset of the cells or it may be for the candidate cells where a change request is imminent or expected. In such a case, where the secondary network node has the measurement information before transmitting the change request then in some embodiments the secondary network node may indicate the preferred special cell with the change request.

In this regard, the measurement information may be information measured at the user equipment regarding the quality of signals that it receives from the secondary network node from the cells supported by that network node.

In some embodiments, the method further comprises receiving said measurement information from said master network node; and selecting one of said cells as a new special cell in dependence upon said received measurement information; and transmitting said selection towards said master network node.

In some cases, the selection of the new special cell is performed on the secondary network node in response to the measurement information it receives from the master network node. Once it has made this selection, it transmits the selection to the master network node as the master network node controls the configuration of the connection with the user equipment. In this way the secondary network node is in control of the change process and can select a preferred special cell. Where the secondary network node is in communication with an unknown master network node with unknown characteristics, perhaps supplied by a different vendor this may be advantageous.

The special cell selection may be transmitted as part of a secondary network node modification request. In some embodiments the master network node may transmit the measurement information in response to the change request and the secondary network node can select a special cell using this information and transmit its selection as part of a special cell modification request. Such a request triggers the secondary network node modification procedure. In this regard, the selected change in the special cell may be transmitted by the secondary network node as part of a resource reconfiguration channel container indicating changes in the special cell transmitted within the modification request. Using the modification procedure in this way allows the user equipment to be informed via the master network node of which cell is the new special cell and of configuration information for this cell including where the functionality supported by this cell such as an uplink control channel is located.

In some embodiments, said measurement information is received from said master network node as part of a secondary network node modification request, and said selection is transmitted as an indication of a change in said special cell at said secondary network node and is transmitted as part of an acknowledgment to said secondary network node modification request.

In some cases, the special cell change request may trigger a master network node initiated secondary network node modification procedure and in which case the measurement information may be received from the master network node as part of the secondary network node modification request sent by this node. In this case, selection of the special cell is transmitted as part of an acknowledgement to the secondary network node modification request. Again, this may be provided in a RRC container and can then be used by the master network node to reconfigure the connection with the user equipment.

In some embodiments, the method further comprises receiving from said network node a secondary network node addition request, said secondary network node addition requesting addition of said secondary network node supporting at least one cell and designating one of said at least one cells as said special cell.

In some cases, rather than triggering a network node modification procedure, receipt of the change request may trigger the master network node to begin a network node addition procedure. In this regard, where one has an embodiment where the secondary network node receives measurement information from the master network node and selects one of the cells as a special cell and transmits this selection to the master network node, at this point the master network node can choose to trigger either a secondary network node addition procedure or a secondary network node modification procedure. In the case of the secondary network node addition procedure then the secondary network node receives a release and addition request and responds with information on one or multiple cells that it supports, one of these will be designated as a new special cell. The master network node may have selected the special cell or it may have received a selection from the secondary network node either with the change request or following some other signalling including transmission of user equipment measurement information. In this regard, the secondary network node will be aware that this addition request is for a user equipment for which it is already configured so it will maintain the bearers communicating with that user equipment and the data plane connection will not be lost, however, it will transfer the functionality of the new special cell to that cell. It will also transmit configuration information regarding that cell to the master network node in the addition request acknowledgement.

In some cases the special cell designated by the addition request will have been selected by the secondary network node while in others it will have been selected by the master network node. Where the master network node has selected the cell it may have done so from a list of candidate cells that has been provided with the special cell change request and perhaps by looking at the measurement information from the user equipment which it has access to. In either case, the addition procedure is triggered and the secondary network node receives an addition request that indicates one of the cells supported by the secondary network node as the new special cell.

In some embodiments, the method further comprises transmitting an indication of a change in said special cell at said secondary network node as part of an acknowledgement to said addition request to said master network node.

The addition request is acknowledged and as part of this acknowledgement indication in the change of the special cell at the secondary network node is provided. This may take the form of configuration information for this cell perhaps in the form of an RRC container providing this information.

In some embodiments in addition to transmitting an indication of a change in said special cell at said secondary network node said secondary network node does not transfer or delete bearers related to the user equipment from the secondary network node.

In general receipt of an addition request at a network node preceded by a release request triggers the transfer/deletion of bearers from the network node and path switch related signalling or data forwarding associated with these change procedures. However, the secondary network node is configured not to perform these procedures in response to the addition request either because the addition request explicitly indicates that they should not be performed or because the secondary network node determines that it is already configured for the user equipment related to the addition request.

In some embodiments, said plurality of cells comprise a special cell group comprising at least one cell supported by the secondary network node and configured for the UE, said special cell comprising one of said cells from said group of cells.gr.

One or more cells supported by the secondary network node may be configured for the UE and termed SCG cells. The special cell should be one of these cells and where there is only one, then this cell should be the special cell. However where there is more than one, then the special cell can be changed from one SCG cell to another.

In some embodiments, said step of determining that a configuration of a cell as a special cell should be transferred to another one of said plurality of cells, comprises at least one of: determining a heavy loading on said special cell; receiving a request from said master network node; determining a low channel quality for said special cell from measurement information received from said master network node.

There are various reasons why a secondary network node may determine that the special cell should be changed. These may include heavy loading on that particular special cell, receiving a request from the master network node or determining a low channel quality for the special cell. The latter will generally be done from measurement information received from the master network node.

A second aspect of the present invention provides a method performed at a master network node within a wireless communication network that supports dual connectivity such that a user equipment may communicate with a master network node and a secondary network node, said secondary network node supporting a plurality of cells, said method comprising: receiving at said master network node a change request indicating that a configuration of a cell supported by said secondary network node as a special cell such that it provides predetermined functionality should be transferred to another one of said plurality of cells; in response to said change request transmitting to said secondary network node one of a secondary network node modification or a secondary network node addition request; and transmitting a radio resource connection reconfiguration request to said user equipment; and indicating to said secondary network node when reconfiguration process is complete.

A master network node which acts with dual connectivity controls the connection with user equipment and where it receives a change request from the secondary network node indicating a change in the special cell, then this may trigger it to either transmit a secondary network node modification or a secondary network addition request. In this regard, either procedure can provide the required change in special cell. Once such a request has been transmitted, an indicator will be received at the master network node that the special cell has been changed and this may be in the form of RRC information indicating the new configuration of the special cell. The master network node will then inform the user equipment of this by transmitting a radio resource connection reconfiguration request to the user equipment and will indicate the secondary network node when this reconfiguration process is complete.

In some embodiments the method further comprises receiving at said master network node radio resource configuration information indicating a change in a cell designated as said special cell at said secondary network node prior to transmitting said radio resource connection reconfiguration request to said user equipment.

The radio resource configuration information for the change may be received from the secondary network node. This may be either with the acknowledgement of the addition or modification request or as part of the change request.

In some embodiments, said radio resource connection reconfiguration request is transmitted as a release and add request requesting release and addition of said secondary network node, said add request comprising parameters identifying a new special cell.

In the case that the master network node triggers a secondary network node addition procedure, then the radio resource reconnection reconfiguration request is transmitted as a release and add request. In this regard, as the secondary network node recognises that it has the configuration information for the user equipment to be added, it does not release the bearers for this UE but rather uses the acknowledge reply to the addition request to transmit configuration information for the new special cell. In this way the configuration parameters can be updated and the new special cell identified. This can be done without losing connectivity.

In some embodiments, said radio resource reconfiguration request comprises a secondary network node modification request for modifying parameters relating to said secondary network node, said modification request comprising parameters identifying a new special cell.

Where the master network node has selected a network node modification procedure, then it will transmit the radio resource reconfiguration request as a secondary network node modification request which contains modified parameters relating to the secondary network node and include parameters identifying the new special cell, allowing the special cell to be updated without losing connectivity.

A third aspect comprises a computer program operable to control a computer to perform methods according a first aspect of the present invention or a second aspect of the present invention.

A fourth aspect of the present invention provides, a network node for use as a secondary network node within a wireless communication network supporting dual connectivity, such that a user equipment may communicate with a master network node and a secondary network node, said network node being operable to support a plurality of cells, said network node comprising: determining logic operable to determine that a designation of one of said plurality of cells as a special cell for said user equipment such that said special cell that provides predetermined functionality should be transferred to another one of said plurality of cells; and communication logic operable to transmit a request for a change in special cell towards said master network node in response to said determining logic determining that said special cell should be changed.

A fifth aspect of the present invention provides a network node for use as a master network node within a wireless communication network supporting dual connectivity, such that a user equipment may communicate with a master network node and a secondary network node, said secondary network node supporting a plurality of cells, said network node comprising: reception logic operable to receive a change request indicating that a designation of a cell supported by said secondary network node as a special cell such that it provides predetermined functionality should be transferred to another one of said plurality of cells; transmission logic operable, in response to said change request, to transmit to said secondary network node one of a secondary network node modification and a secondary network node addition request; wherein said reception logic is operable to receive radio resource configuration information indicating a change in a cell designated as said special cell at said secondary network node; and said transmission logic is operable in response to receipt of said radio resource configuration information to transmitting a radio resource connection reconfiguration request to said user equipment and to indicate to said secondary network node when reconfiguration process is complete.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further by way of example, with reference to the accompanying drawings, in which:

FIG. 1 illustrates special cell change scenarios;

FIG. 2 illustrates special cell change using SeNB initiated SeNB modification procedure;

FIG. 3 illustrates special cell change using MeNB initiated SeNB modification procedure;

FIG. 4 illustrates special cell change using SeNB Change procedure;

FIG. 5 illustrates special cell change using an alternative SeNB Change procedure.

DESCRIPTION OF THE EMBODIMENTS

Figure 6:
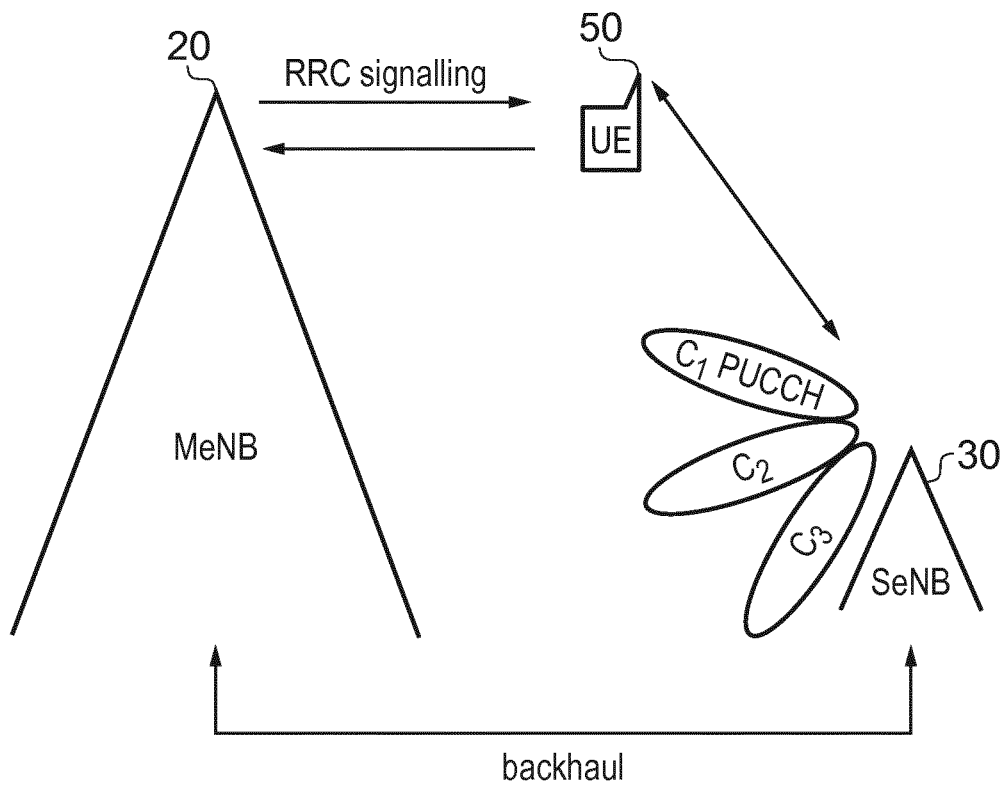
FIG. 6 illustrates a macro master network node and secondary network node comprising a plurality of small cells

Before discussing the example embodiments in any more detail, first an overview will be provided.

Dual connectivity where a user equipment communicates with and consumes radio resources of two network nodes at a same time has being standardized in 3GPP. Dual connectivity involves the UE connecting to master (MeNB) and secondary eNBs (SeNB) at the same time. There is a special cell in the SeNB, which is in charge of specific functionalities such as PUCCH resources.

As per the current agreement in 3GPP, special cell change is up to the SeNB. For example, if two or more secondary SCells are configured for the SeNB for a particular user equipment, the SeNB can configure one of the SCells to be the special cell. Similarly, SeNB can change the special cell to another configured SCell. In order for the SeNB to make the special cell change decision, the channel quality information of the corresponding SCells is required at the SeNB. For the configured SCells, the channel quality information is available at the SeNB.

However there is situation where the SeNB needs to change the special cell to a non-configured cell belonging to the same SeNB. This is a typical scenario where SeNB is only configured with one Cell, eg, due to UE capability limitation. In the above scenario, as per the current agreement at 3GPP, the channel quality information for the non-configured cell is not available at the SeNB. Therefore, SeNB is not able to make the correct decision of change of special cell thus resulting in service interruption to the UE.

It would be desirable to provide a method of changing the special cell to a non-configured cell of the same SeNB without interrupting the ongoing UE communication to the SeNB.

One available solution is to follow the SeNB change procedure, where the SeNB is changed under control of the master network node and the configuration information updated allowing a new special cell to be configured. The entire change procedure is unnecessary as the same eNB is involved before and after SeNB change and this would result in user plane interruptions. Furthermore, allowing the SeNB to be in charge of its radio resources and providing independent SeNB operation may be beneficial in inter-vendor interoperability deployment scenario where a small cell from one vendor is provided in another vender's macro network.

In summary the above problems may be addressed by at least one of the following:

1). SeNB is in charge of the special cell change and requests/decide on when to and which cell for the special cell change.

2). SeNB informs MeNB of the special cell change request/decision

3). Further SeNB may request MeNB of measurements information for a list of candidate special cells. This can happen in conjunction with or independent of (before or at any time) the special cell change request.

4). MeNB acts upon the SeNB request.

According to the dual connectivity concept, there is one special cell of SeNB configured with some primary PCell-like functions, such as control of UL PUCCH resource, DL RAR (random access request) transmission for PRACH procedure conducted on the SeNB and etc. The special cell of SeNB is always active while SCG (secondary cell group) is configured. The special cell can be changed due to various reasons such as overload situation, and bad radio situation.

If only one SCG Cell is configured for the UE, that cell is the special cell. However when more than one SCG secondary SCells are configured for the UE, the special cell could be changed from one SCG Cell to another. The procedure for special cell change from one configured SCell to another is referred to as Special cell change procedure.

Another scenario for special SCG cell change is that the UE is configured with only one SCG cell belonging to the SeNB and the UE is to be reconfigured with another cell of the same SeNB. It is also possible that the SCG is configured with only one cell even though there are other suitable cells of SeNB for the UE. However, the UE capability may limit the configuration of the number of SCG cells. When the special SCG cell change is triggered, the network may need to change the special SCG cell to another cell of the SeNB which was not configured for the UE prior to the special cell change. Considering that the same SeNB is involved before and after the special cell change, this is also referred as special SCG cell change procedure. SeNB may trigger the change of special SCG cell due to its PUCCH load or based on RRM (radio resource management) decision. Special cell change scenarios are illustrated in FIG. 1. Scenario A) is where special cell change to another configured cell of the SeNB. Scenario B) is where special cell is changed to non-configured cell of SeNB.

When special SCG cell change is triggered, it is useful for the SeNB to have measurement reports on the corresponding SeNB cells in order to select the special cell appropriately, i.e. to select a cell with good channel quality.

The special cell change procedure according to a first embodiment is shown in FIGS. 2 and 3. SeNB makes the decision for special cell change. The decision is communicated to MeNB, in a scenario where the SeNB doesn't have up to date measurement information of the candidate special cells, the SeNB may include a list of candidate special cells in the message to the MeNB. Upon reception of this request message indicating the SeNB decision for change of special cell, MeNB may follow two approaches in assisting the change of special cell.

In approach 1 shown in FIG. 2, the MeNB provides the requested measurement information for the candidate special cells to the SeNB. After taking into account the cell measurements, the SeNB selects the new special cell. This allows the selection to be under control of the secondary network node which is advantageous where this node is within another vendor's network.

The SeNB can then inform the UE of the new configuration corresponding to the special cell change via SeNB initiated SeNB modification procedure. According to the SeNB initiated SeNB modification procedure, the SeNB provides the new SeNB radio configuration to the UE via MeNB, the new radio configuration is transmitted in a RRC container from the SeNB to the MeNB. MeNB signals the new RRC configuration to the UE over RRCConnectionReconfiguration message.

In another approach for signalling of special cell change to the UE by MeNB, the reconfiguration of special cell change can be done by a special deletion and addition of the same secondary network node; the special deletion and addition process is done as part of one single procedure that does not result in a transfer of bearers from the secondary network node. The new SeNB configuration part of the message is provided by the SeNB in the RRC container while the release of the SeNB part of the message is generated by the MeNB.

Upon applying the new configuration, the UE transmits an RRCConnectionReconfigurationComplete message to the MeNB. The MeNB forwards the RRC connection reconfiguration complete information to the SeNB. The UE gains UL uplink synchronization to the SeNB with the new radio configuration by performing random access procedure.

In approach 2 shown in FIG. 3, upon reception of SeNB message containing SeNB decision to change special cell and candidate special cells, the MeNB initiates the special cell change using MeNB initiated SeNB modification procedure. The MeNB transmits a SeNB modification request to the SeNB together with measurements information of candidate special cells, and/or all configured cells of the SeNB. The SeNB replies with the SeNB modification request Acknowledgement including the radio configuration parameter corresponding to the new special cell. MeNB performs the RRC connection reconfiguration towards the UE similar as in approach 1. Upon the reception of RRCConnectionReconfigurationComplete message, the MeNB forwards the SeNB modification complete message to the SeNB.

The special cell change procedure according to a second embodiment is shown in FIGS. 4 and 5. In the embodiment of FIG. 4 the SeNB makes the decision to change the special cell and provides the MeNB with a selected or candidate special cell list. Upon reception of the message, the MeNB uses SeNB change procedure to perform the special cell change. The MeNB initiates the SeNB change procedure by transmitting SeNB addition request together with selected special cell as a Scell selected from the measurement list. Thus, in this case the selection is performed by the MeNB. The SeNB configures the selected cell as the special cell and performs SeNB configuration for the UE. Note that the UE context is available at the SeNB as the SeNB was previously configured for the UE. The SeNB interprets the reception of SeNB addition request for the same UE as an indication of intra-SeNB change procedure. Therefore transfer/deletion of bearers from SeNB, path switch related signalling or data forwarding which are associated with inter-SeNB change procedure are not performed by the SeNB.

Instead of implicit indication of intra-SeNB change as described above, in one embodiment, an explicit indication from the MeNB of intra-SeNB change is provided. Thus the SeNB addition request message also carries the intra-SeNB change indication. Similar to the above implicit indication based procedure, the transfer/deletion of bearers from SeNB, path switch related signalling or data forwarding which are associated with inter-SeNB change procedure are not performed by the SeNB.

Another variant of this second embodiment is shown in FIG. 5. In this case measurement information for the candidate special cells are requested by the SeNB prior to the decision of which is to be the special cell. Alternatively, the MeNB may periodically or based on some events provide measurement reports to the SeNB. SeNB can use this information to decide on a new Special cell in advance.

The MeNB performs the SeNB change procedure to change the special cell as requested by the SeNB as discussed above.

In the embodiment shown in FIG. 5, the master network node transmits measurement information to the secondary network node in response to the special cell change request and the SeNB makes the decision on the special cell and informs the MeNB of the decision. At this point the MeNB can implement the change using either a cell change procedure such as that shown in FIGS. 4 and 5 by sending an addition request to the SeNB which recognises that it is for a UE for which it is already configured or by sending an RRCconnectionReconfigurationRequest to the UE with the information regarding the new reconfiguration for the secondary cell as is performed in the latter part of the embodiments of FIGS. 2 and 3.

In an alternative embodiment to those shown in FIGS. 2 to 5, there may be some occasions where the secondary network node selects the special cell itself without requiring the measurement information to be sent. This may be the case where for example the decision on the switch is taken on other considerations such as knowledge of the geographical cell area, or where some measurement information is already available at the secondary network node. In such cases the request signal is transmitted by the secondary network node with an RRC container providing details of the selected special cell. This avoids the need for the measurement information to be transmitted and for the secondary network cell to respond with the RRC container, thus, these steps in the method of FIGS. 2 to 5 can be omitted in these particular cases.

FIG. 6 schematically shows a master network node MeNB 20 which is a macro network node and is connected to a user equipment 50 and is in control of the connection such that RRC signalling which configures the connectivity is performed between them. There is also a small network node 30 which acts as a secondary network node SeNB for user equipment 50 and can transmit and receive data from the user equipment 50. The configuration information that allow this connection is controlled by the master network node 20 which communicates with the secondary network node 30 via a backhaul link. Network node 30 supports a plurality of cells with different carrier frequencies c1, c2 and c3. One of these c1 is configured as a special cell for the connection with UE 50 and is in control of the uplink control resource for the data connection provided in this embodiment by a PUCCH physical uplink control channel. Where the SeNB 30 determines that the loading of cell c1 is becoming high it may wish to change the cell that is configured as the special cell. In order to this it transmits a special cell change request to master network node 20, and in response to this master network node 20 triggers a cell modification or addition procedure as shown in FIGS. 2 to 5, which procedure allows it to retrieve configuration information regarding the new special cell from the secondary network node 30 and to transmit this information to the user equipment. In this way the connection is configured such that control of the PUCCH resource is transferred to a different one of the cells c2 or c3 for the connection to UE 50.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method performed at a secondary network node within a wireless communication network supporting dual connectivity, such that a user equipment may communicate with a master network node and the secondary network node, said secondary network node supporting a plurality of cells, said method comprising:
   determining at said secondary network node that a configuration of one of said plurality of cells as a special cell for said user equipment such that said special cell provides predetermined functionality should be transferred to another one of said plurality of cells;
   in response to said determining step, transmitting a request for a change in special cell towards said master network node; and
   receiving from said master network node one of a secondary network node modification request or a secondary network node addition request;
   wherein said master network node is configured to receive radio resource configuration information indicating the change in the cell designated as said special cell at said secondary network node prior to transmitting a radio resource connection reconfiguration request to said user equipment;
   wherein said radio resource connection reconfiguration request comprises a secondary network node modification request for modifying parameters relating to said secondary network node, said modification request comprising parameters identifying a new special cell; and
   wherein the special cell is configured to control downlink random access request (RAR) transmission for Physical Random Access Channel (PRACH) procedure.

2. A method according to claim 1, further comprising determining which of said plurality of cells would be suitable candidate cells for use as special cells, and transmitting a list of at least one candidate cell in said change request.

3. A method according to claim 1, wherein said change request further comprises a request for measurement information for at least some of said cells.

4. A method according to claim 1, further comprising transmitting a request for measurement information for at least some of said plurality of cells towards said master network node.

5. A method according to claim 3, further comprising:
   receiving said measurement information from said master network node; and
   selecting one of said cells as a new special cell in dependence upon said received measurement information; and
   transmitting said selection towards said master network node.

6. A method according to claim 5, wherein said measurement information is received from said master network node as part of the secondary network node modification request received by said secondary network node, and said selection is transmitted as an indication of the change in said special cell at said secondary network node and is transmitted by said secondary network node as part of an acknowledgment to said received secondary network node modification request.

7. A method according to claim 1, wherein the one of the secondary network node modification request or the secondary network node addition request comprises the secondary network node addition request, and wherein the method further comprises:
receiving, from said master network node, the secondary network node addition request, said secondary network node addition request requesting an addition of said secondary network node supporting at least one cell and designating one of said at least one cells as a new special cell; and
transmitting an indication of the change in said special cell at said secondary network node as part of an acknowledgement to said addition request to said master network node and not transferring or deleting bearers related to the user equipment from the secondary network node.

8. A method according to claim 1, wherein said determining that the configuration of a cell as a special cell should be transferred to another one of said plurality of cells, comprises at least one of:
determining a heavy loading on said special cell;
receiving a request from said master network node; and
determining a low channel quality for said special cell from measurement information received from said master network node.

9. A method performed at a master network node within a wireless communication network that supports dual connectivity such that a user equipment may communicate with the master network node and a secondary network node, said secondary network node supporting a plurality of cells, said method comprising:
receiving at said master network node a change request indicating that a configuration of a cell supported by said secondary network node as a special cell such that it provides predetermined functionality should be transferred to another one of said plurality of cells;
in response to said change request, transmitting to said secondary network node one of a secondary network node modification request or a secondary network node addition request;
transmitting a radio resource connection reconfiguration request to said user equipment;
indicating to said secondary network node when reconfiguration process is complete; and
receiving, at said master network node, radio resource configuration information indicating the change in the cell designated as said special cell at said secondary network node prior to transmitting said radio resource connection reconfiguration request to said user equipment;
wherein said radio resource connection reconfiguration request comprises a secondary network node modification request for modifying parameters relating to said secondary network node, said modification request comprising parameters identifying a new special cell; and
wherein the special cell is configured to control downlink random access request (RAR) transmission for Physical Random Access Channel (PRACH) procedure.

10. A non-transitory computer readable medium comprising program instructions for causing said computer to perform a method according to claim 1.

11. A network node for use as a secondary network node within a wireless communication network supporting dual connectivity, such that a user equipment may communicate with a master network node and the secondary network node, said network node being operable to support a plurality of cells, said network node comprising:
at least one processor; and
at least one memory including computer program code, the at least one memory and the computer program code configured to, with the at least one processor, cause the network node at least to:
determine that a configuration of one of said plurality of cells as a special cell for said user equipment such that said special cell provides predetermined functionality should be transferred to another one of said plurality of cells; and
transmit a request for a change in special cell towards said master network node in response to said determination that said special cell should be changed, and to receive from said master network node one of a secondary network node modification request or a secondary network node addition request;
wherein said master network node is configured to receive radio resource configuration information indicating the change in the cell designated as said special cell at said secondary network node prior to transmitting a radio resource connection reconfiguration request to said user equipment;
wherein said radio resource connection reconfiguration request comprises a secondary network node modification request for modifying parameters relating to said secondary network node, said modification request comprising parameters identifying a new special cell; and
wherein the special cell is configured to control downlink random access request (RAR) transmission for Physical Random Access Channel (PRACH) procedure.

12. A network node for use as a master network node within a wireless communication network supporting dual connectivity, such that a user equipment may communicate with the master network node and a secondary network node, said secondary network node supporting a plurality of cells, said network node comprising:
at least one processor; and
at least one memory including computer program code, the at least one memory and the computer program code configured to, with the at least one processor, cause the network node at least to:
receive a change request indicating that a configuration of a cell supported by said secondary network node as a special cell such that it has control of predetermined functionality should be transferred to another one of said plurality of cells;
in response to said change request, transmit to said secondary network node one of a secondary network node modification request and a secondary network node addition request; wherein
receive radio resource configuration information indicating a change in a cell configured as said special cell at said secondary network node;
in response to receipt of said radio resource configuration information, transmit a radio resource connection reconfiguration request to said user equipment and to indicate to said secondary network node when reconfiguration process is complete;
receive radio resource configuration information indicating the change in the cell designated as said special cell at said secondary network node prior to the transmitter transmitting said radio resource connection reconfiguration request to said user equipment, wherein said radio resource connection reconfiguration request comprises a secondary network node modification request for modifying parameters relating to said secondary network node, said modification request comprising parameters identifying a new special cell; and wherein the special cell is configured to control downlink random access request (RAR) transmission for Physical Random Access Channel (PRACH) procedure.

13. A user equipment operable to communicate with a master network node and a secondary network node supporting a plurality of cells, the user equipment comprising:
at least one processor
at least one memory including computer program code, the at least one memory and the computer program code configured to, with the at least one processor, cause the user equipment at least to:
apply a configuration of the plurality of cells supported by the secondary network node such that one of said plurality of cells is configured as a special cell for providing predetermined functionality and wherein said secondary network node is configured to initiate a change of special cell by transmitting a request for the change in special cell towards said master network node and, in response, receiving one of a secondary network node modification request or a secondary network node addition request, from said master network node and responding thereto;

receive a RRCConnectionReconfiguration message from the master network node containing a new radio resource control (RRC) configuration including an indication of the change of special cell;

apply the new RRC configuration;

transmit an RRCConnectionReconfigurationComplete message towards the master network node; and perform a random access procedure to gain synchronization to the secondary network node with the new RRC configuration with changed special cell;

wherein the special cell is configured to control downlink random access request (RAR) transmission for Physical Random Access Channel (PRACH) procedure.

14. A method according to claim 1, wherein the special cell is configured to control uplink Physical Uplink Control Channel (PUCCH) resource.

\* \* \* \* \*